United States Patent [19]
Herbert

[11] Patent Number: 6,137,392
[45] Date of Patent: Oct. 24, 2000

[54] TRANSFORMER FOR SWITCHED MODE POWER SUPPLIES AND SIMILAR APPLICATIONS

[76] Inventor: Edward Herbert, 1 Dyer Cemetery Rd., Canton, Conn. 06019-2029

[21] Appl. No.: 09/412,062

[22] Filed: Oct. 4, 1999

Related U.S. Application Data

[60] Provisional application No. 60/103,135, Oct. 5, 1998.

[51] Int. Cl.$^7$ .......................... H01F 17/06; H02M 3/335
[52] U.S. Cl. .......................... 336/175; 363/24; 323/339; 323/361
[58] Field of Search .................. 336/175, 61; 363/8, 363/44–48, 80–89, 127, 24–27; 323/282, 339, 338, 361

[56] References Cited

U.S. PATENT DOCUMENTS

| | | | |
|---|---|---|---|
| 4,484,108 | 11/1984 | Stupp et al. | 315/219 |
| 4,560,908 | 12/1985 | Stupp et al. | 315/219 |
| 4,665,357 | 5/1987 | Hertbert | 323/361 |
| 4,845,606 | 7/1989 | Herbert | 336/175 |
| 4,866,585 | 9/1989 | Das | 363/8 |
| 4,942,353 | 7/1990 | Hertbert et al. | 323/361 |
| 4,978,906 | 12/1990 | Hertbert et al. | 323/361 |
| 5,093,646 | 3/1992 | Herbert | 336/225 |
| 5,479,146 | 12/1995 | Herbert | 336/61 |
| 5,570,279 | 10/1996 | Venkataramanan | 363/127 |

*Primary Examiner*—Lincoln Donovan
*Assistant Examiner*—Tuyen Nguyen

[57] ABSTRACT

A transformer for switched mode power supplies and the like comprises an input stage transformer section which is designed for very good coupling and very low primary leakage inductance, without regard for insulation above "working insulation" or for interwinding capacitance. One or more additional stage transformer sections are optimized for very low interwinding capacitance and very high dielectric isolation. The secondary of the input stage drives the primary of the next stage, so that the transformer stages are in series. Accordingly, the total interwinding capacitance from end to end is very low and the total dielectric isolation from end to end is very high. The secondary of the input stage transformer is isolated from both the input and the output, so it can be grounded as a safety ground. Because the input stage can be designed without regard for capacitance or isolation, it can be smaller, lighter, less expensive and have better thermal and high frequency characteristics, enough so that the transformer as a whole can be smaller, lighter, less expensive and have better thermal and high frequency characteristics than a single stage transformer of comparable rating.

14 Claims, 10 Drawing Sheets

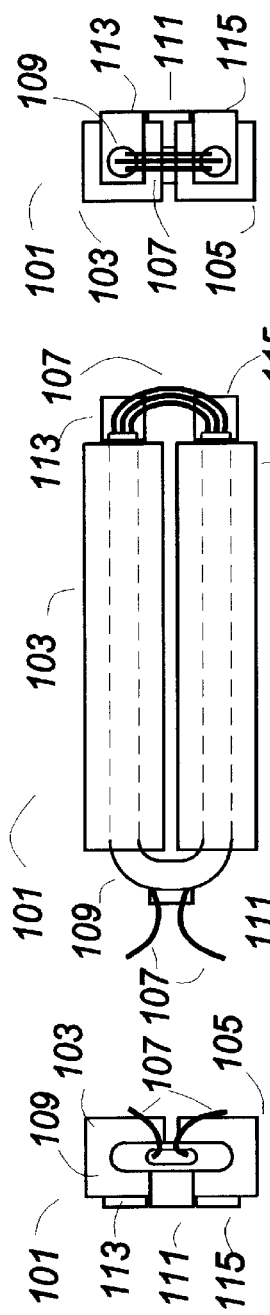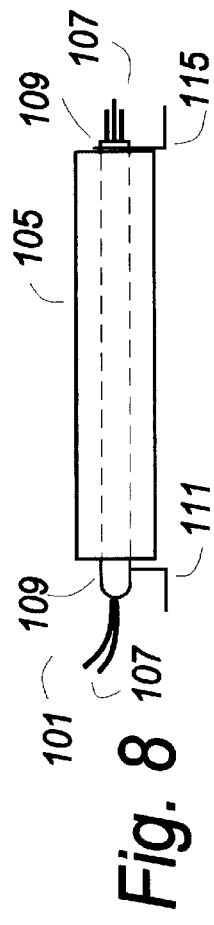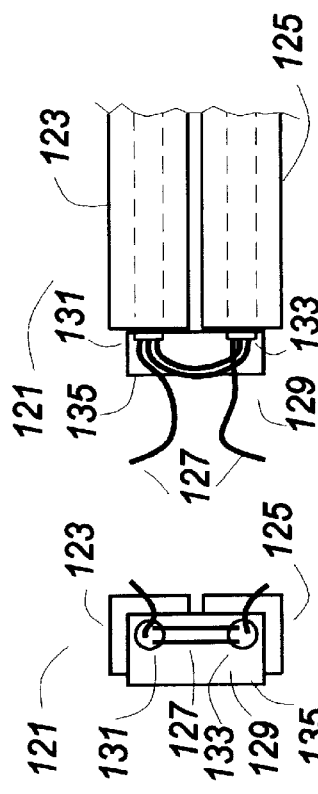

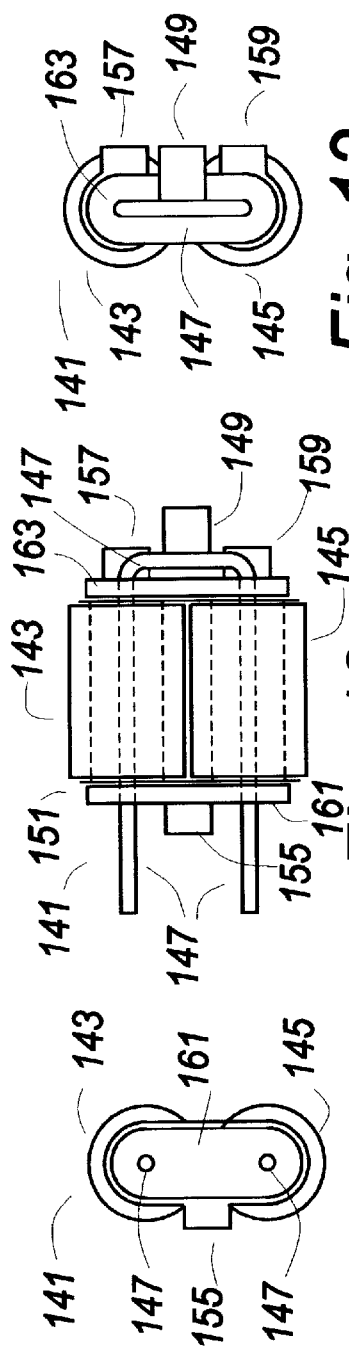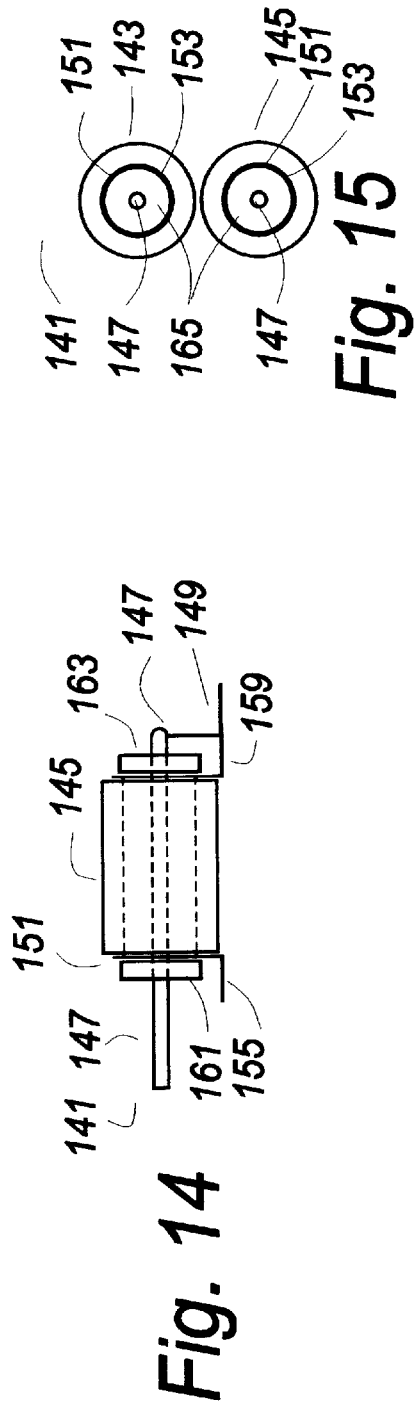

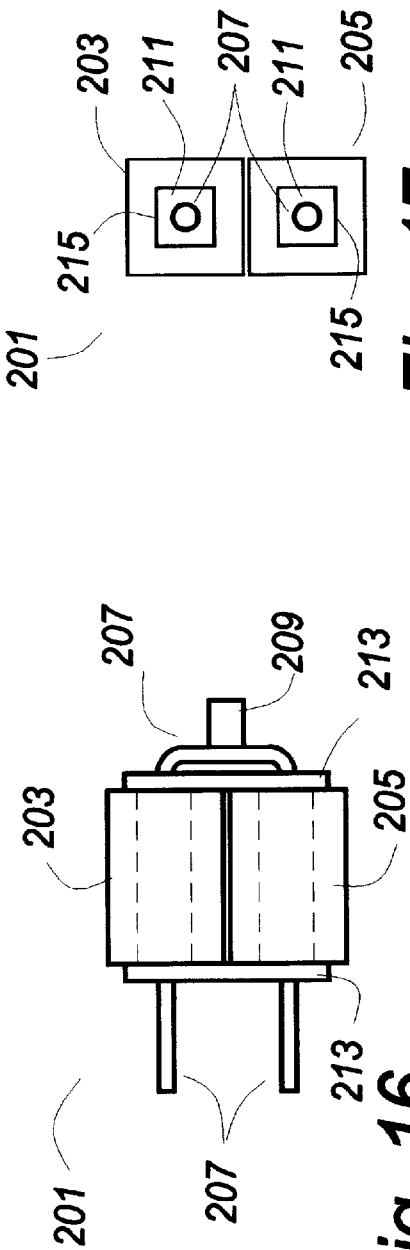
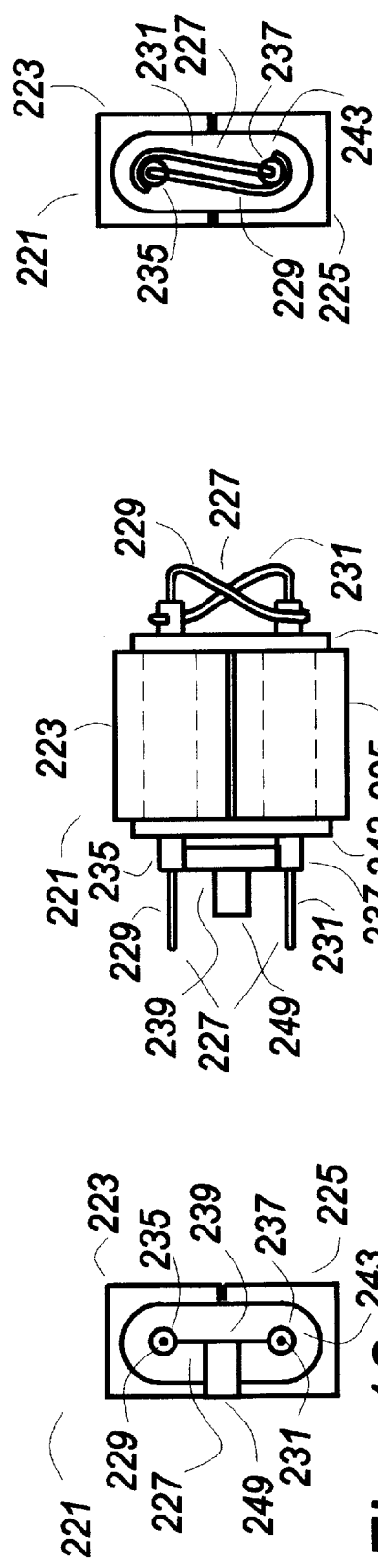

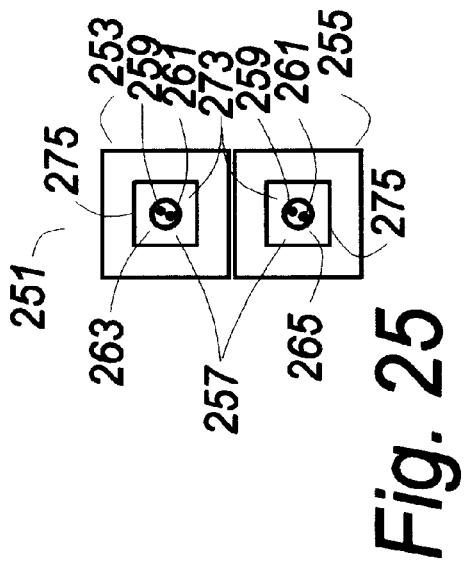
Fig. 21
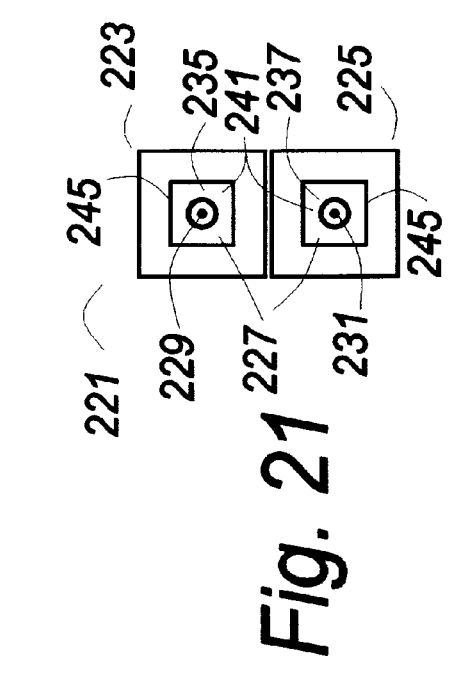
Fig. 25
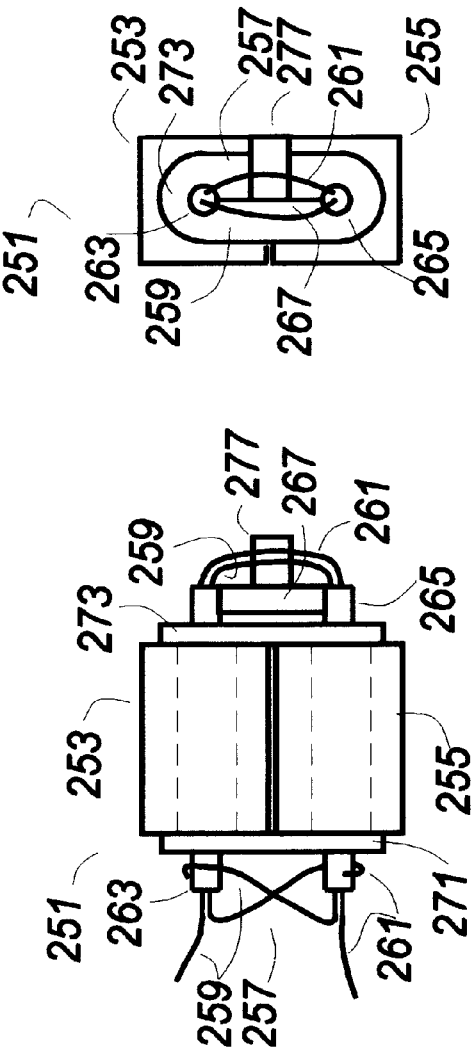
Fig. 24
Fig. 23
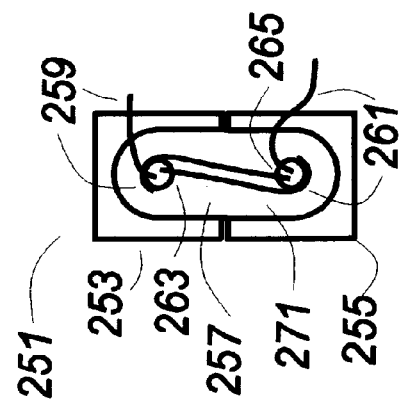
Fig. 22

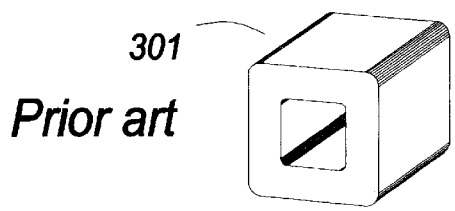
Fig. 26 *Prior art*
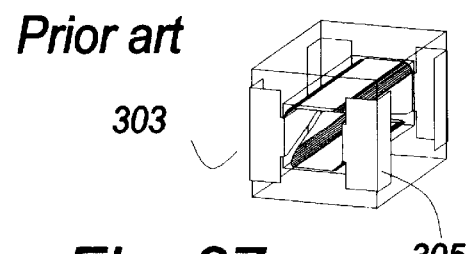
Fig. 27 *Prior art*
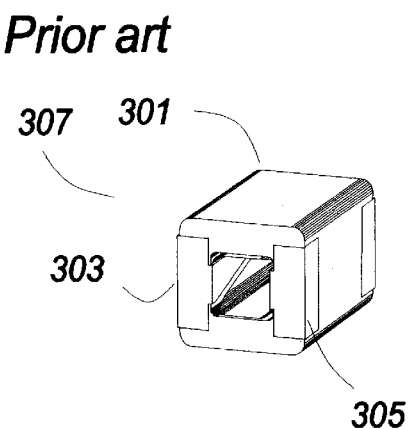
Fig. 28 *Prior art*
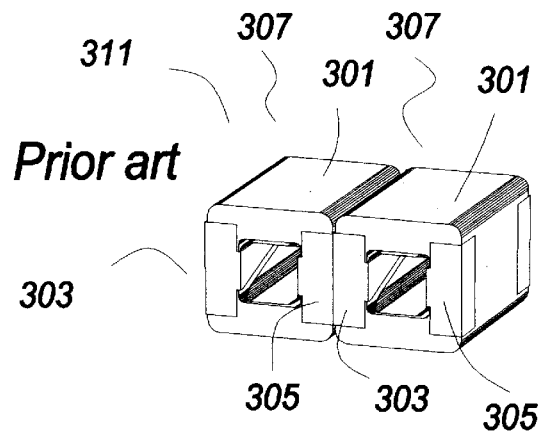
Fig. 29 *Prior art*
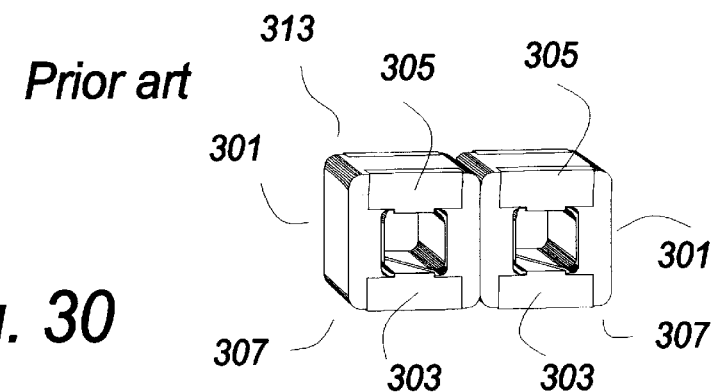
Fig. 30 *Prior art*

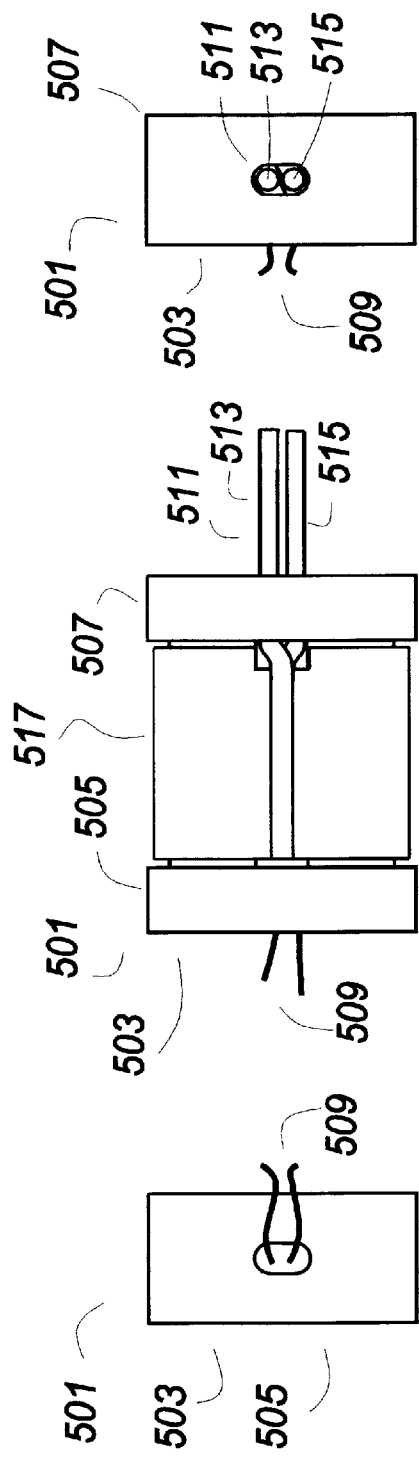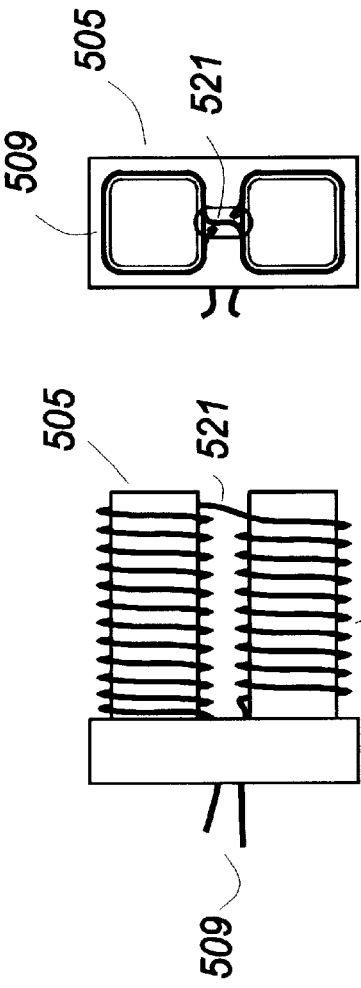

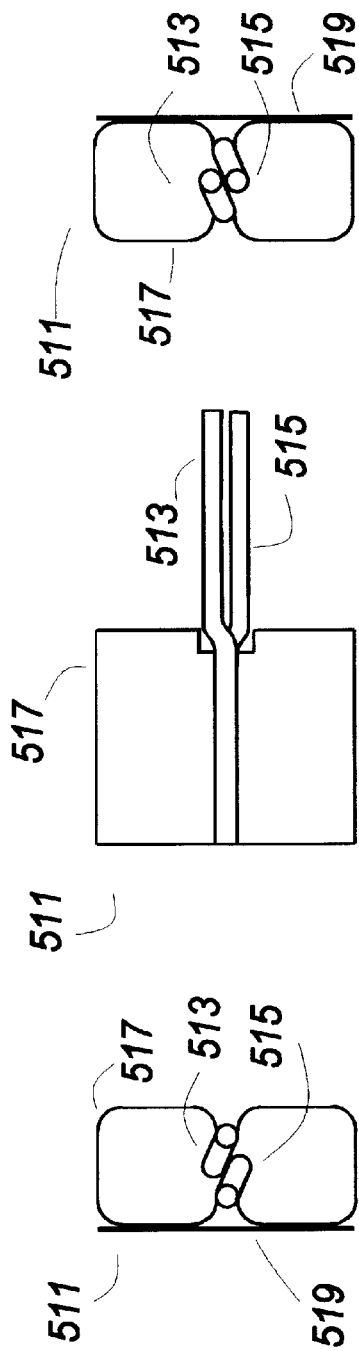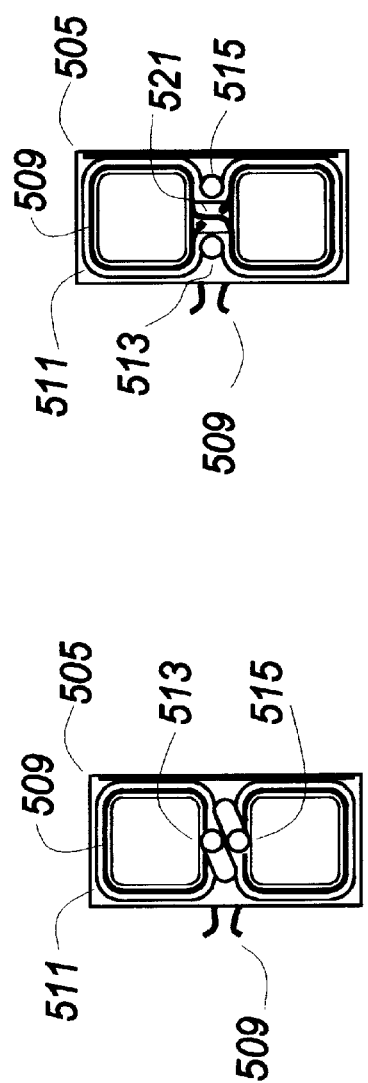

TRANSFORMER FOR SWITCHED MODE POWER SUPPLIES AND SIMILAR APPLICATIONS

This patent application is a continuation in part application of a provisional patent application with the same title, Ser. No. 60/103,135 filed Oct. 5, 1998. Priority is claimed to its filing date.

BACKGROUND OF THE INVENTION

Transformers for switched mode power supplies and other similar applications are becoming more and more critical as operating frequencies rise and as agency safety requirements become more stringent.

Leakage inductance becomes more and more critical as frequency rises. The cores should become smaller with increasing frequency, in theory, but may actually become larger, in practice, due to flux derating. Proximity effects become severe, and overheating is a serious problem.

The matrix transformer solves many of these problems. Please see U.S. Pat. Nos. 4,665,357; 4,845,606, 4,942,353; 4,978,906, 5,093,646 and 5,479,146, which describe various embodiments of the matrix transformer, and which are incorporated herein by reference.

Reference is also made to a tutorial entitled "Design and Application of Matrix Transformers and Symmetrical Converters" by the present inventor and published May 11, 1990.

The matrix transformer works particularly well for switched mode power supplies having a low voltage, high current output. The matrix transformer uses fewer primary turns, because the number of elements used is a factor in the equivalent turns ratio. That is, the equivalent turns ratio is the product of the number of primary turns and the number of elements (modules) used to one. This relationship assumes a one turn secondary winding. Often, a one-turn push pull secondary winding (alternatively called a two-turn, center-tapped winging) is used, to directly drive a dual rectifier.

For low power applications, where, from a power perspective, fewer elements could be used, the number of primary turns can still be quite high, particularly when operated from a high voltage source. This can make the matrix transformer difficult to wind and also reintroduces some of the problems of conventional transformers.

Agency safety requirements, though very necessary, are not at all helpful in designing transformers for switched mode power supplies and like applications. Thicker insulation is required, with more layers and spacing, all of which increase the bulk of the winding and increase its leakage inductance and thermal impedance.

Where shock hazard is a concern, interwinding capacitance must be kept very low. Interwinding capacitance can also conduct EMI from the input to the output and vice versa.

This invention addresses many of these problems.

SUMMARY OF THE INVENTION

This invention teaches that a transformer for switched mode power supplies and like applications can be made with two or more stages, which may lower the number of turns needed in any one stage. This invention also teaches design features of the two or more stages which cooperate to improve the overall characteristics of the transformer and to decrease its overall size, weight and cost.

The improved characteristics include a small size and low profile, very simple construction, a very low temperature rise, a very low primary leakage inductance, a very low capacitance from the input to the output and very high dielectric isolation.

In a transformer having two or more stages, the overall effective turns ratio is the product of the turns ratios of the stages. As an example, whereas a conventional 20 to one transformer must have a minimum of 20 primary turns, the transformer of this invention could have a five turn input stage first winding and a four turn second stage first winding.

Also, in a transformer having two or more stages, the parasitic interwinding capacitance from the input to the output is the capacitance of two or more interwinding capacitances in series, which is always lower in value than the lowest value interwinding capacitance. Thus if one stage of two or more stages is optimized to have a very low parasitic interwinding capacitance, the overall transformer will have a very low parasitic capacitance from its input to its output.

Also, the interstage connection can be balanced, isolated and grounded, to provide a high degree of noise isolation and safety. The interstage connection can be conditioned, as with a low pass filter and/or snubbers, to further reduce noise transmitted from the input to the output, or vice versa.

In some embodiments of this invention, the input stage has a "U" shaped tubular second winding which may be grounded at its center. The first winding is heat sunk and shielded by the "U" shaped tubular second winding, and it is output to the next stage is balanced and low potential.

The interstage connection can be filtered or snubbered, to further reduce noise conducted from the input to the output of the transformer.

In another embodiment of this invention, the input stage comprises a "U–I" or "U—U" core upon which a first winding is wound. The second winding comprises a shield like foil wrap which may be grounded, and which may be a heat sink for the input stage. The terminations to the next stage are taken from the shield like foil wrap.

This invention also teaches how to adapt a balanced winding to a push pull winding having an effective half turn, to double the effective turns ratio. A flux and current balancing winding is used.

BRIEF DESCRIPTION OF THE DRAWINGS

FIGS. 5 through 8 show, respectively, an end view, a top view, another end view and a side view of a input stage of a transformer of this invention having a tubular second winding.

FIGS. 9 and 10 show, respectively, an end view and a partial top view of an alternative tubular winding construction.

FIGS. 11 through 15 show, respectively, an end view, a top view, another end view, a side view and a section of an intermediate stage having a tubular second winding.

FIGS. 16 and 17 show, respectively, a top view and a section of an output stage having a one turn first winding and a tubular second winding.

FIGS. 18 through 21 show, respectively, an end view, a top view, another end view and a section view of an alternative output stage having a two turn first winding and a tubular second winding.

FIGS. 22 through 25 show, respectively, an end view, a top view, another end view and a section view of an alternative output stage having a three turn first winding and a tubular second winding.

FIG. 26 shows a prior art core which would be suitable for use in the transformer.

FIG. 27 shows a prior art winding which would be suitable for use in the transformer.

FIG. 28 shows the winding of FIG. 27 installed in the core of FIG. 26.

FIGS. 29 and 30 show two cores with windings in alternative orientations.

FIGS. 36 through 45 show another embodiment of an input stage, with views showing details of its construction and the various component parts thereof.

DESCRIPTION OF THE PREFERRED EMBODIMENT

Figure 1:
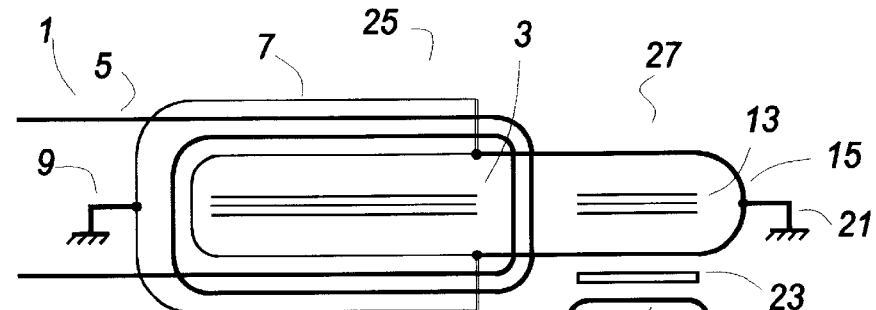
FIG. 1 shows a diagram of a two stage transformer having a tubular input stage second winding and one output.
Figure 2:
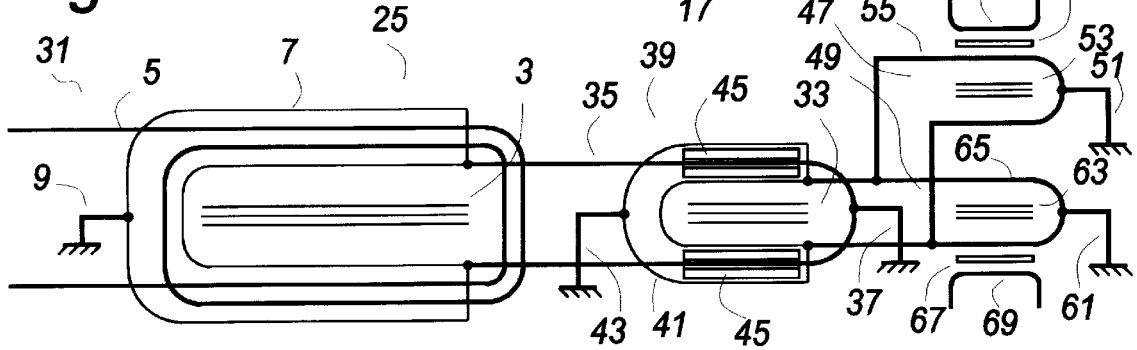
FIG. 2 shows a diagram of a three stage transformer having a tubular input stage second winding, a tubular intermediate stage second winding and two outputs.
Figure 3:
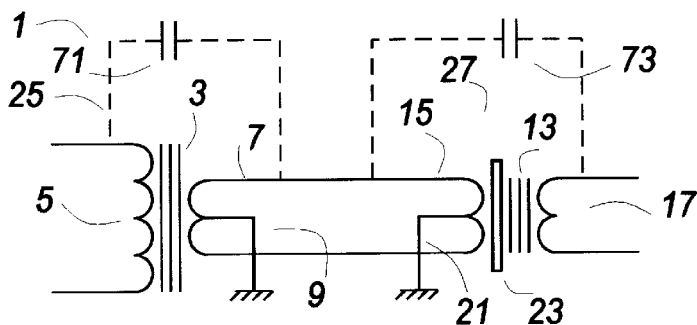
FIG. 3 is a schematic diagram of the transformer of FIG. 1, also showing the parasitic interwinding capacitors.
Figure 4:
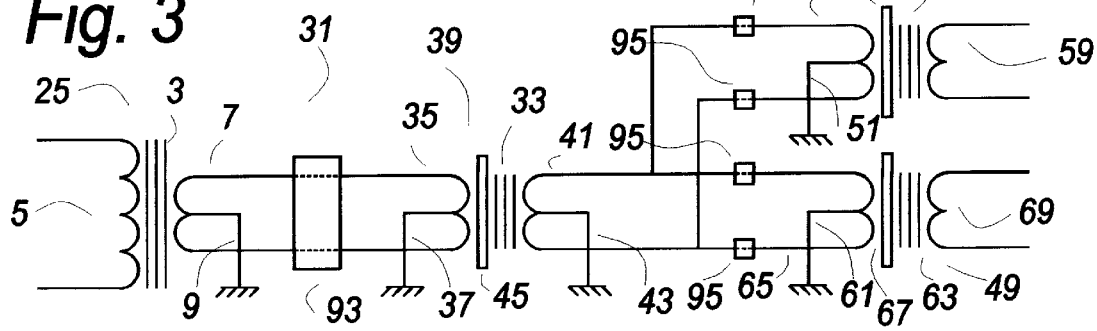
FIG. 4 is a schematic diagram of the transformer of FIG. 2, also showing optional inter-stage filtering or snubbing.

FIGS. 1 and 2 are diagrams of the transformers 1 and 31, respectively. The features of the diagram represent and suggest the physical structure, but do not show the actual physical details. FIGS. 3 and 4 are schematic diagrams, of the same transformers 1 and 31, respectively, drawn using usual schematic symbols.

With reference to both FIGS. 1 and 3, the transformer 1 comprises an input transformer stage 25 and an output transformer stage 27.

The input stage 25 comprises a first winding 5 (input transformer stage primary winding), a core 3 (input transformer stage magnetic core) and a second winding 7 (input transformer stage secondary winding). The input stage second winding 7 may have a ground connection 9 at its center. In FIG. 1, the input stage second winding 7 is shown as a "U" shaped tubular structure 7, and to the greatest extent practical, the input stage first winding 5 is wound within it. As an illustration, not a limitation, the input stage first winding 5 is shown as a single winding having two turns. Any number of turns can be similarly wound. Also, different winding configurations may be used, such as push-pull (center-tapped) windings or split windings.

The first winding 5 has first and second terminations, which comprise the electrical input of the transformer for connecting the transformer to a source of input power.

The output stage 27 comprises a first winding 15 (output transformer stage primary winding), a core 13 (output transformer stage magnetic core), and a second winding 17 (output transformer stage secondary winding). The first winding 15 may have a ground connection 21 at its center. A spacer 23 shows that the output stage first winding 15 is spaced well apart from the output stage second winding 17, as will be further discussed below, to provide high dielectric isolation and low interwinding capacitance.

The output stage second winding has terminations which are the electrical output of the transformer for supplying power to an external load.

FIG. 3 also shows parasitic capacitors 71 and 73 which represent, respectively, the interwinding capacitance 71 of the input stage windings 5 and 7 and the interwinding capacitance 73 of the output stage windings 15 and 17.

With reference to both FIGS. 2 and 4, the transformer 31 comprises the same input stage 25 as shown in FIGS. 1 and 3, an intermediate stage 39 and two output stages 47 and 49.

The intermediate stage 39 comprises a first winding 35 (intermediate transformer stage primary winding), a core 33 (intermediate transformer stage magnetic core) and a second winding 41 (intermediate transformer stage secondary winding). Spacers 45—45 show that the intermediate stage first winding 35 is spaced well apart from the intermediate stage second winding 41. In FIG. 2, the intermediate stage second winding 41 is shown as a "U" shaped tubular structure, 41, and to the greatest extent practical, the intermediate stage first winding 35 is wound within it. The intermediate stage first winding may have a first ground connection 37. The intermediate stage second winding may have a second ground connection 43. The first grounds 9 and 21 are differentiated from the second ground 43 by the use of a different symbol, and they may be isolated one from the other.

The output stages 47 and 49 are similar, but may vary in detail. Each has a first winding, 55 and 65, respectively, and a core, 53 and 63 respectively. The first windings 55 and 65 may have second grounds 51 and 61 respectively, which may be common with the second ground 43.

As an example, not a limitation, the first grounds 9 and/or 21 may be connected to a source environment safety ground and the second grounds 43, 51 and or 61 may be connected to an output environment safety ground.

Second windings 59 and 69 are shown as being well spaced from the first windings 55 and 65 respectively, by spacers 57 and 67, respectively. The output stages 47 and 49 may be the same, to provide similar but isolated output voltages, or they may be different, to provide different isolated outputs. In many cases, the turns ratios would differ, to provide different voltages. Even with the same turns ratios, the output stages 47 and 49 might be different, to have a different rated current, as an example, not a limitation.

FIG. 4 shows a number of blocks, 93 and 95—95. No corresponding part is included in FIG. 2. These blocks show that windings could be conditioned between stages, as an option, such as with snubbers or low pass filters, as examples, not limitations.

The design of high frequency transformers for switched mode power supplies and like applications involves a number of compromises. On the one hand, for best cost, the transformer should be small and simple. For good performance, the leakage inductance must be small and the coupling must be very good. For safety, the various parts must be well insulated, with multiple layers of insulation, and the various parts must be spaced well apart.

The extra spacing required for safety and the extra thickness of insulation seriously degrade leakage inductance and thermal conductivity from the winding and core to the ambient, as well as increase the cost, volume and weight.

There are well known methods for decreasing the leakage inductance and increasing the coupling, such as interleaved windings, but these tend increase interwinding capacitance, tend to make it very difficult to meet safety criteria and tend to be labor intensive and expensive.

Inter-winding capacitance is a serious problem for several reasons. Although transformers are, ideally, isolating, the interwinding capacitance provides an AC conduction path from the input to the output which can carry sufficient AC currents to cause a shock hazard, particularly under certain fault conditions. In addition, the interwinding capacitance can conduct electromagnetic interference from the input to the output, and vice versa.

Techniques to reduce the interwinding capacitance are known, but they tend to make the problems of leakage inductance much worse and they may severely limit the power rating of the transformer.

In other words, it is very difficult to satisfy all of the requirements in a transformer, and the outcome is likely to be an unsatisfactory compromise.

Many of these problems can be reduced by the use of a multistage transformer. If well executed, the combined size and cost of the two or more stages will be less than a single stage transformer of equal ratings, and the performance will be superior.

Figure 33:
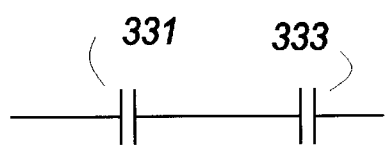
FIG. 33 shows series capacitors.

Consider first the inter-winding capacitance. With reference to FIG. 33, if two capacitors 331, 333 are placed in series, the combined capacitance will be lower than the capacitance of the smaller capacitor. Similarly, in a multistage transformer, if one stage is optimized to have very low interwinding capacitance, the multistage transformer as a whole will have very low interwinding capacitance from input to output.

Consider next the insulation, for safety. With series dielectric insulation, the dielectric insulation of the whole is sum of the dielectric insulation of the stages. If triple insulation is required, a three stage transformer could have one layer of insulation in each stage. If one stage has sufficient insulation to meet all of the safety requirements for supplemental or reinforced insulation, the other stage(s) may need only to have working insulation.

Consider next the benefits of factoring the turns ratio. It is very beneficial in a high frequency transformer to reduce the number of turns in a winding. In a single stage conventional transformer, the minimum number of turns that the primary winding can have is fixed. Assuming a single turn secondary winding, and a turns ratio of N to 1, the minimum number of primary turns is N. In a multistage transformer, the turns ratio is the product of the turns ratio of each stage. As an example, not a limitation, a 20 to 1 transformer could be implemented as a input stage with a 5 to 1 ratio and a second stage with a 4 to 1 ratio.

Consider next the benefits of an isolated interstage connection. With reference to FIGS. 1 and 3, the input stage 25 first winding 5 is common to the power source circuitry. The output stage 27 second winding 17 is common to the output load circuitry. The input stage 25 second winging 7 is common with the output stage 27 first winding 15, but both are isolated form the power source and the load.

If the potential of the center of the input stage 25 second winding 7 is defined as zero, the outputs of the input stage 25 second winding 7 are balanced positive and negative voltages. With balanced and positive and negative voltages as its source, the output stage 27 first winding 15 will have zero potential at its center. Accordingly, these points of zero potential can be connected, if desired, such as by ground connections 9 and 21. This ground can be a safety ground. Any fault between the windings in the transformer 1 will be conducted to safety ground. By using the center of each winding 7 and 15, there is a very short conduction path for any fault.

Another benefit of grounding the center of the windings 7 and 15 is that the ground connections 9 and 21 may be designed as heat sinks (heatsinking means), to lower the temperature rise of the windings 7 and 15, and permit a higher current rating.

Figure 35:
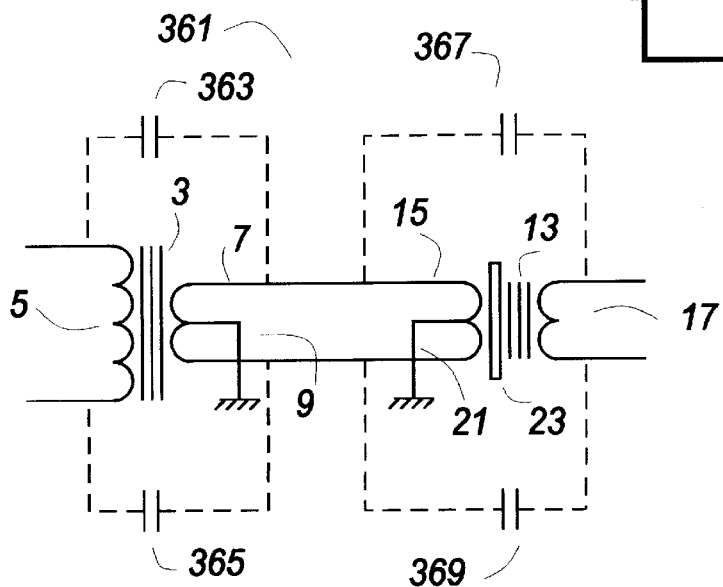
FIG. 35 shows the schematic of FIG. 3, further defining the parasitic interwinding capacitances.

With reference to FIG. 35, with symmetrical construction and careful assembly, the two sides of each windings 5, 7, 15 and 17 can have nearly the same capacitance. In this case, the capacitors 71 and 73 of FIG. 3 can be represented as pairs of capacitors, 363 equal to 365 and 367 equal to 369. The schematic cannot adequately show the nature of an interwinding capacitance, however, as its effects are distributed, not single point connections as shown. Most potentials in the transformer will occur with opposite phase in the capacitor pairs, so that the noise conducted by the interwinding capacitors 363, 365, 367 and 369 largely will be canceled.

The input stage 25 may be better understood with reference to FIGS. 5 through 8. Because the input stage 101 of FIGS. 5 through 8 is but one of many possible embodiments of the invention, different reference designators are used, but the correlation with FIGS. 1 through 4 will be apparent.

In dividing the several requirements for a transformer among stages, all stages should be optimized for low losses, low temperature rise, small size and economical construction. In applications having a commercial power source and low voltage output(s), the input stage should be optimized for handling the highest voltage windings, and to present the best characteristics to the source side Switched Mode switching circuit. Low leakage inductance is particularly important here, to reduce switching losses.

The input stage 101 comprises a pair of transformer cores 103, 105 into which a "U" shaped second winding 109 has been inserted. As an example, not a limitation, the first winding 107 has three turns, and is wound within the second winding 109, terminating at its center, on the left end as drawn. Any number of turns can be wound similarly, and other winding configurations can be used, such as push-pull (center-tapped) windings and split windings, providing that the currents and fluxes are properly balanced.

The second winding 109 is terminated, as an illustration, not a limitation, by surface mount terminals 113 and 115. A grounding surface mount terminal 111 may be connected to the center of the second winding 109, and may be used as a safety ground. The three terminals 111, 113 and 115 may be used to mount the input stage 101, and may provide heat sinking for the second winding 109, which in turn, can provide heat sinking for the cores 103 and 105 and for the first winding 107.

FIGS. 9 and 10 show another input stage 121. A second winding 129 comprises a mounting bracket 135 connecting two tubes 131 and 133. The first winding 127 is wound inside the second winding 129. The open ends of the tubes 131 and 133 may facilitate winding. This construction has a similarity to the "bazooka" transformer used in RF circuits.

If one is used, an intermediate stage may provide additional series capacitance, to further reduce the end to end capacitance; it may provide a second isolated safety ground, and it may be a factor in the overall turns ratio.

With reference to FIGS. 2 and 4, a first ground 9 and/or 37 may be connected to a safety ground associated with the input power source (source environment). However, under some fault conditions, the safety ground associated with the input power source may have a dangerous potential with respect to the load environment. This can occur if the safety ground circuit is open somewhere. If a fault occurred in such circumstances, in this equipment or in other equipment which is connected to the same safety ground, then the safety ground does not function as intended, and can, in fact, become a source of dangerous potential. Another scenario could be an intact, but overloaded safety ground or one where the final earth ground is too far away. In either case, significant potentials can be present on the safety ground.

By using a three stage transformer, a second safety ground can be grounded to the local environment (output environment). Alternatively, a three stage transformer with very high dielectric isolation in at least two of the stages would double insulate the output from the input and may allow operation without having a safety ground connection. Because a safety ground can become a source of dangerous potential in some situations, and thus be part of the problem, not the solution, there is merit to having a design that does not require any safety ground to meet leakage current and other shock hazard criteria.

Also with reference to FIGS. 2 and 4, and noting again that in a series capacitor string the capacitance of the string is lower than the capacitance of the lowest capacitor, the intermediate stage may be designed to have the lowest interwinding capacitance. The input stage, with an input source derived from commercial power, and more turns, may have relatively high interwinding capacitance. If two or more output stages are used, the combined parallel interwinding capacitance of the several output stages may also be high. By designing an intermediate stage with optimally low interwinding capacitance, the capacitance of the input and output stages becomes unimportant for input to output capacitance, and those stages may be optimized for other parameters.

To achieve lower capacitance, an intermediate stage and an output stage can both be designed with very low interwinding capacitance. As an example, not a limitation, if the interwinding capacitances of an intermediate stage and an output stage are approximately equal, the series capacitance will be reduced by half.

FIGS. 11 through 15 show an intermediate stage 141, although for some applications, it could be the output stage. A second winding 151 is installed in a pair of transformer cores 143 and 145. A first winding 147 is installed in the second winding 159.

The first winding 147 is very simple, comprising a single wire bent into a "U", and it may comprise a center ground tab 149. The second winding 151 comprises a pair of tubes 153, 153, a mounting plate 155 connecting the tubes 153, 153, and terminals 157 and 159. The second winding 151 may be grounded at its center through the mounting plate 155.

The first winding 147 is surrounded within the tubes 153, 153 with thick insulation 165, 165, preferably having a low dielectric constant. Teflon® would be suitable, having a dielectric constant relative to air of about 2.0. The windings are also separated on the ends by thick insulators 161 and 163. This arrangement reduces the interwinding capacitance, as is discussed further below.

The intermediate stage 141 has a balanced single turn first winding 147 with an optional ground 149 at its center, and a balanced single turn second winding 151 with an optional ground through the mounting plate 155 at its center. Although the second winding 149 is "center-tapped", it would not be suitable as a push-pull output winding for a dual rectifier as a push-pull full wave rectifier. It is intended to drive one or more output stages, though it might be useful as an output in some applications where current balance and flux balance were properly considered. (With modified windings, as explained below in reference to FIGS. 47 to 50, the winding could be used as a push pull winding. It would be a "half turn" winding, so the turns ration would be doubled.)

FIGS. 16 and 17 show a top view and a section of an output stage 201 comprising two transformer cores 203 and 205. A second winding 215, 215 (the details and terminations of which are shown later, with reference to FIGS. 26 through 30) is bonded to the inside of the cores 203 and 205. A first winding 207 comprises a wire bent into a "U", and may comprise a ground tab 209 at its center. Between the first winding 207 and the second winding 215 are thick insulators 211, 211, preferably of material having a low dielectric constant. Except for the second winding detail, the output stage 201 is quite similar to the intermediate stage 141 of FIGS. 11 through 15.

FIGS. 18 through 21 show, respectively, an end view, a top view, another end view and a section of an output stage 221, comprising two transformer cores 223 and 225. A second winding 245, 245 (the details and terminations of which are shown later, with reference to FIGS. 26 through 30) is bonded to the inside of the cores 223 and 225. A first winding 227 comprises two tubes 235 and 237 connected by a mounting plate 239, and two wires 229 and 231 which pass through the tubes 235 and 237 respectively, then cross over on the right end and connect, each to the other tube, wire 229 to tube 237 and wire 231 to tube 235. The mounting plate 239 may provide a center grounding point 249. Thick insulators 241, 241, preferably of low dielectric material, separate the first winding 227 from the second winding 245. The first winding 227 and the second winding 225 are also separated on the ends by thick insulators 243, 243.

By following the wire 229 through the tube 235 to the tube 237, which connects to the tube 235 through the mounting plate 239, then to the wire 231, it can be seen that the first winding 227 is a two turn winding. Because the wire could pass through the tubes again and again, symmetrically, this is a generic drawing for any output stage having an even number of first winding turns. The first winding details are also generic for any intermediate stage having an even number of first winding turns.

Note that the center of the first winding 227 may be grounded at the mounting plate 239 through the grounding tab 249, and that the tubes 235 and 237 would have a balanced potential never greater than the potential of half a turn. In the two turn example of FIGS. 18 through 21, the maximum potential on the tubes 235 and 237 is a balanced plus and minus one fourth of the first winding voltage. The higher potential ends of the first winding 227 are shielded by the tubes 235 and 237.

The output stage 251 of FIGS. 22 through 25 comprises two transformer cores 253 and 255. A second winding 275, 275 (the details and terminations of which are shown later, with reference to FIGS. 26 through 30) is bonded to the inside of the cores 253 and 255. A first winding 257 comprises a pair of tubes 263 and 265 connected by a mounting plate 267, a first wire 259 passing through both tubes 263 and 265 then connecting to the tube 263, and a second wire 261 passing through both tubes 263 and 265 then connecting to the tube 265. The mounting plate 267 may have a grounding tab 277.

If one traces the conduction path through the first winding 257, it can be seen that it makes three turns through the output stage 251, and has a balanced, grounded center turn which shields the high potential ends of the first winding 257.

Because the wires 259 and 261 could be threaded again and again through the tubes 263 and 265 symmetrically, this is generic for any winding having an odd number of turns, three or greater. The same first winding design can be used in an intermediate stage.

FIG. 26 shows a transformer core 301 which would be suitable for the several transformers and transformer stages shown above, as an illustration, not a limitation. The square shape is functionally very like a cylindrical core, but the square outer surfaces are better for mounting and heat sinking, and the square inner surfaces are better for formed windings to be installed therein.

FIG. 27 shows two prior art windings 303 and 305 which are suitable for installing in the core 301 of FIG. 26. Each winding is a half turn helix, so that opposite corners are connected by the winding. This is for the convenience of the external connections which are made to the flat surfaces at the corners.

FIG. 28 shows the windings 303 an 305 installed in the core 301. Preferably the windings 303 and 305 are bonded tightly to the core 301, for good heat transfer and bulk material snubbing. If the core material is conductive, the windings 303 and 305 must be insulated from the core, as by an insulating film coating.

The cores and windings are usually used in pairs, such as the circuit 307 of FIG. 29 or the circuit 313 of FIG. 30. Whatever external circuit configuration is used, the correct balance of the flux and currents must be maintained.

Figure 31:
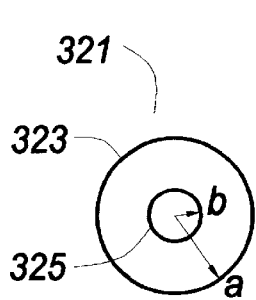
FIGS. 31 and 32 show an end view section and a side view of a coaxial capacitor, to define parameters a, b and l for the equation of capacitance.
Figure 32:
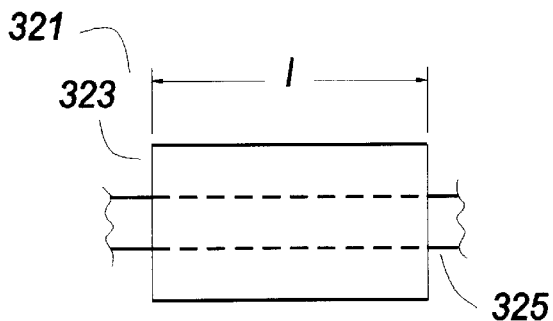

FIGS. 31 and 32 show a cylindrical capacitor 321 having an outer electrode 323 of radius a and length l, and a center electrode 325 of radius b.

The capacitance of a cylindrical capacitor is given by equation [1], following, where C is the capacitance in farads, l, b and a are in meters, $\epsilon$ is the dielectric constant of the material relative to air, $\epsilon_o$ is the dielectric constant of air, ($1.113 \times 10^{-10}$ in unrationalized MKS units).

$$C = \frac{\varepsilon \cdot \varepsilon_o \cdot l}{2 \cdot \ln\left(\frac{a}{b}\right)} \quad [1]$$

Note that the absolute size of the radii of the inner and outer electrodes does not matter, only their ratio (a/b) and the length l. As an example, not a limitation, if the ratio of the outside radius a to the inside radius b is five to one, the capacitance is less than one picofarad per centimeter of length. Even if the ratio of the outside radius a to the inside radius b is two to one, the capacitance is less than two picofarads per centimeter. The smaller value should be easily achieved with a single wire design, for example, the intermediate stage 141 of FIGS. 11 through 15, and the output stage 201 in FIGS. 16 and 17. The larger value should be easily achieved with the tubular winding versions, for example, the output stage 221 of FIGS. 18 through 21 and the output stage 251 of FIGS. 22 through 25, and intermediate stages using the same first winding design.

With squared outer conductors, the equation above will be a reasonable approximation, and the approximation will be conservative if one half of the smallest inside dimension of the square tube is used as the "radius a" dimension.

Figure 34:
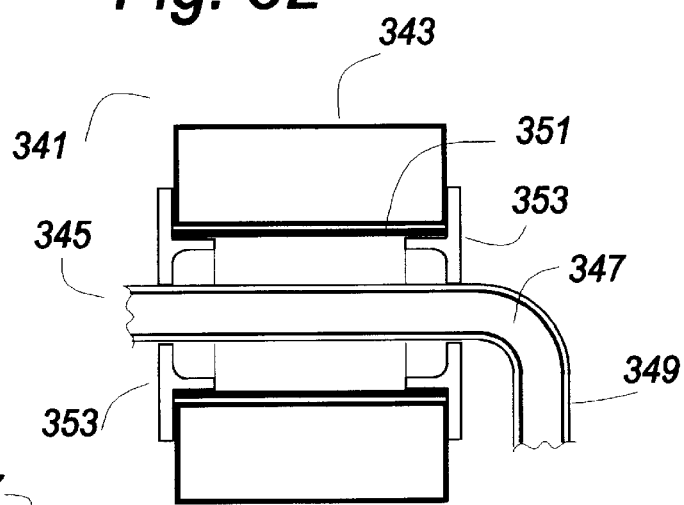
FIG. 34 shows a section view of one half of an output stage having a one turn first winding and a tubular second winding, with mostly air dielectric.

FIG. 34 shows that the interwinding capacitance can be reduced further. A partial view of an intermediate or an output stage 341 comprises a transformer core 343. A second winding 351 is bonded to the inside of the core 343, and may be either a single turn tubular winding or a push pull winding, the former is more suitable for an intermediate stage, and the latter is more suitable for an output stage.

A first winding 345 comprises a conductor 347 bent in a "U" which may have an insulating coating 349, preferably of low dielectric, such as Teflon®. The first winding 345 may be positioned within the core 343 and the second winding 351 by one or more bushings 353, 353, also preferably of low dielectric material, such as Teflon®.

As can be seen, most of the volume between the first winding 345 and the second winding 351 is empty, filled with air. As Teflon® has a dielectric constant of 2, double that of air, the capacitance can be approximately halved by using a design which has mostly air in the space between the windings 345 and 351.

With reference again to FIGS. 31 and 32, and equation [1] for capacitance above, the capacitance is reduced if the radius of the inner conductor 325 is reduced. This would also increase the current density in the inner conductor 325, if the current remains constant. The principle limit on current density in a short conductor is its temperature rise (though, in some instances, the increased resistance may be a consideration). With reference to FIGS. 11 through 14 and FIG. 16, the wire 147 or 207 may have a grounding tab, 155 or 209. The grounding tab may provide heat sinking, if it is attached to a heat sink.

Figure 46:
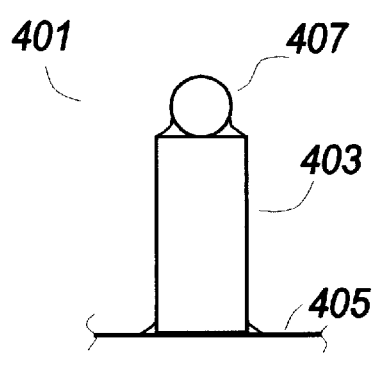
FIG. 46 shows a method of heatsinking a winding.

Unfortunately, the heat sink may have more capacitance than the winding itself, partly defeating the benefits of reducing the wire size. FIG. 46 shows that the inner conductor, represented by the wire 407 can be heatsunk with a ceramic standoff 403, preferably soldered to the conductor 407 and to a heat sink 405. The ceramic standoff 403 will increase the capacitance marginally, but not nearly as much as would an electrically conductive connection to a heat sink. A plurality of ceramic standoffs could support the wire and locate it central to the second winding without needing the bushings 353, 353. As an example, not a limitation, one standoff could be located at the center point, and two could be located on the ends, so that there was only air around the wire as it passed, centrally located, through the second winding, for minimum dielectric constant.

With reference to FIG. 34, the insulating inserts 353, 353 could be made of ceramic, to better conduct heat from the center conductor 347. The best ceramic conductor of heat is beryllia, which has a dielectric constant of about 6.5.

FIGS. 36 through 38 show another input stage 501. FIGS. 39 through 45 show details of its construction.

A "U–I" magnetic core 503 comprising a "U" part 505 and an "I" part 507 has a first winding 509 wound thereon. A second winding 511 surrounds the first winding 509 and is terminated through a centrally located hole in the "I" core part 507 by wires 513 and 515. The second winding 511 comprises a foil sheath 517, and may further comprise a surface mountable ground connection and heat sink plate 519.

FIGS. 39 and 40 show more particularly the details of the first winding 509. It is wound upon the "U" core part 505 so as to generate a circulating flux through it and the "I" core part 507, when the "I" core part 507 is later installed. A pair of "U" cores, shorter, would be a viable alternative. As would be well known to one skilled in the art of transformers, the turns of the first winding 509 must be insulated from each other and from other conductive parts which it may touch.

The first winding 509 could be wound on a square coil form as two sections, and the two sections could then be slipped over the "U" core part 505 with the connecting wire 521 unbroken. Alternatively, if the insulation on the wire is sufficient, the first winding 509 could be free formed and slipped over the "U" core part 505 otherwise bare, especially if a self-bonding wire were used. As another alternative, the winding could be wound on a one part rectangular core, to avoid having to have an air-gap where the two core parts 505 and 507 meet, to reduce the reluctance of the core. The crossover 521 can be on the other end, near the base of the "U" core part 505. A thin insulating layer could be used on the "U" core part 505. The choices of construction at the detail level is not a point of novelty, and various winding, construction and insulating details would be well understood by one skilled in the art of transformer winding.

The second winding 511 comprises a wrap of foil 517 around the first winding 509. The terminating wires 513 and 515 terminate the second winding 509 on its larger surfaces, between the coils of the first winding 509. As shown, the foil 517 tucks into the space between the coils of the first winding 509, and the wires 513 and 515 are soldered to the foil 517 within the tucks, as an illustration, not a limitation.

In the finished input stage 501, the outer foil 517 can be grounded to a first ground, which can also be a heat sink. A plate 519 soldered to the foil may facilitate this connection and the heat sinking. The foil, preferably of copper, provides a self-shield for the input stage 501, and also provides an excellent heat sink for the first winding 509 so that it can carry high current.

The foil 517 can be slipped over the first winding 509 easily if it is expanded somewhat, then it can be tightened around the first winding 509 by pushing inward on the tucks. As shown in FIG. 45, a cross section, the crossover 521 of the first winding 509 will not interfere with installing the second winding 511.

The wires 513 and 515 exit the input stage 501 through a center hole in the "I" core part 507. As shown, they are given a half twist, so that the hole can be an oval, parallel to the flux path. The ratio of the input stage 501 is the number of turns of the first winding 509 to one. As shown, the first winding 509 has total of 22 turns. Thus the input stage 501 has a turns ratio of 22 to one, as shown, as an illustration, not a limitation.

It is necessary to bring the wires 513 and 515 through the center of the core with respect to its magnetic circuit, so that one half of its effective cross sectional area is on each side. Bringing the leads 513 and 515 through a hole in the core also provides attenuation for common mode noise.

The leads of the first winding 509 are shown entering the input stage 501 through a centrally located hole in the base of the "U" core part 505. Unlike the second winding 511, the entry of the leads of the first winding 509 is arbitrary, and need not be through the centrally located hole. They could alternatively enter together on either side of the core, at either end, or wherever it is convenient to terminate them for a particular design. However, the arrangement shown provides attenuation of common mode noise. The crossover 521 can be at either end.

The second winding 511 can be very close to the first winding 509 with only working insulation between them, if sufficient additional insulation will be provided for safety in the additional stage(s) of the transformer. This will optimize the heat sinking and reduce leakage inductance. That it increases the interwinding capacitance is not very important, as the input stage will be in series with another stage having low interwinding capacitance. However, if the second winding 511 is used as a safety ground, two layers of insulation may be needed. It could be considered to be the equivalent of a shield.

Alternatively, the second winding 511 can be terminated by bringing out both of the wires 513 or 515 on one side of the "I" core part 507 or the other instead of through a center hole. In this case, the voltage on the wires 513 and 515 will be the same, but it will not be balanced with respect to the foil 517, but rather, single ended. The input stage will not work if the wires 513 and 515 are each brought out on the same side as it is connected to the foil. The wires can be crossed over between the "U" legs of the core 505 and each brought out the opposite side, but the turns ratio will be reduced by half.

The ends of the core 503 are shown as having flat surfaces that extend beyond the winding 511. This is so the core can be mounted flat to a heat sink to reduce the core temperature. This is an optional feature. Alternatively, the core could be designed to fit snuggle inside the foil, and the foil 517 could extend over the ends of the core 503, even surrounding it entirely, with small holes for the lead wires to enter and exit. The lead wires may be shielded, and the shields may, as an option, be bonded to the foil 517, to completely enclose and shield the input stage of the transformer.

In some applications, it may be desirable to modify the balanced second windings so that they can be used as push-pull windings, to drive a pair of rectifiers for a full wave rectified output, as an example, not a limitation. To operate properly in this mode, a flux balancing winding must be added.

Figure 47:
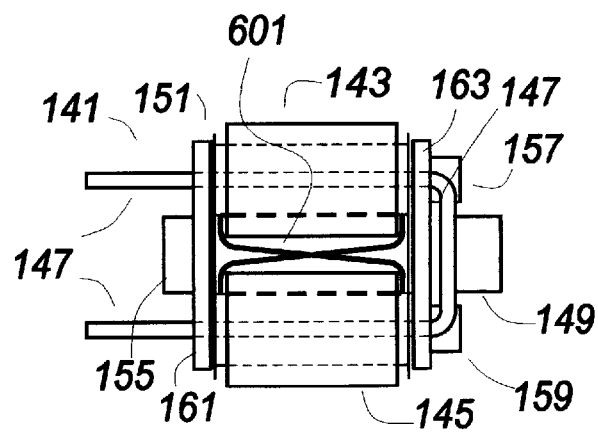
FIG. 47 shows a balancing winding, to convert the balanced second winding of the intermediate stage of FIG. 12 to a push-pull output winding having a half turn.

FIG. 47 shows a balancing winding 601 added to the intermediate stage 141 of FIG. 12.

Figure 48:
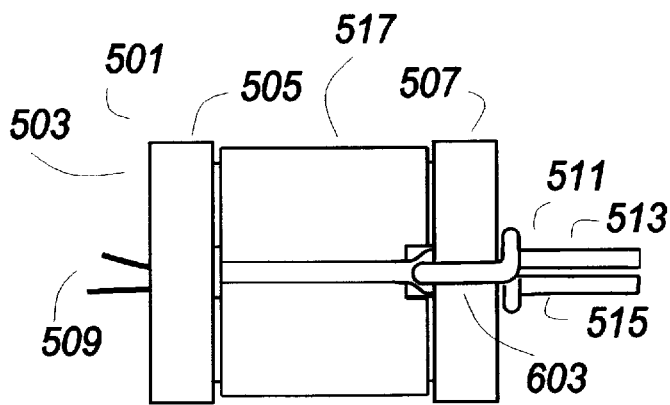
FIGS. 48 through 50 show a balancing winding, to convert the balanced second winding of the input stage of FIGS. 36 through 45 to a push-pull output winding having a half turn.
Figure 49:
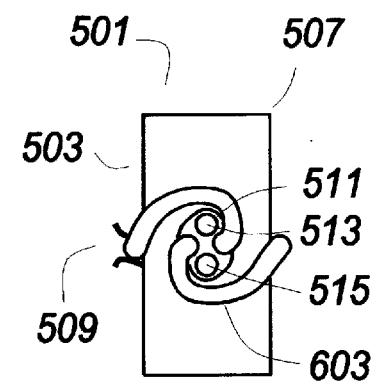
Figure 50:
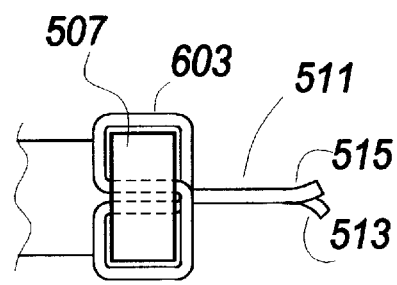

FIGS. 48 through 50 show a balancing winding 603 added to the input stage 501 of FIGS. 37 and 38. FIG. 50 is a section through the "I" core part 507, showing that the balancing winding 603 is a distorted "figure 8", crossing over, but not connected at the crossover. In this configuration, the input stage 501 can be used as a transformer, alone, without additional stages, if desired. The second winding 511, when used as a push pull winding with a balancing winding 603, has an effective one half turn, so the turns ratio is doubled. In the present example, with 22 turns of the first winding, the turns ratio will be 44 to 1. The foil 517 becomes the center-tap of the second winding 511. The leads 513 and 515 of the second winding 511 must exit through the centrally located hole in the "I" core part 507, or its functional equivalent.

In operation with a push-pull full wave rectifier, the balancing winding 601 or 603 will have the same average current as each of the output leads, so it must be of comparable gauge. In practice, since it is short and may have reasonably good heat sinking, it may be satisfactory to use a lighter conductor, with care.

The windings 601 and 603 are shown having a single turn in a figure "8" pattern, each end around half of the flux of the transformer stage. Without it, the currents would not be balanced for the two flux paths. Although shown as having single turns, that is not necessary. Each end of the figure "8" could have any number of turns as long as they were equal and the ends were cross connected as shown. Because the current in the balancing winding is half the output current, divided by the number of turns, a multi-turn balancing winding can be used as a current sense winding.

As an example, not a limitation, if the winding in FIGS. 48 through 50 made 10 turns around one side of the "I" core part 507, then crossed over and made 10 turns around the other side of the "I" core part 507, in the pattern shown by the balancing winding 603, its ends could be used as would be the outputs of a current transformer. (That requires that they be connected with a short circuit or a very low impedance.) If used with a PWM power supply, the current in the ten turn balancing winding will be a PWM square wave with an amplitude equal to half of the peak output current divided by 10. Thus, its average current, rectified, will be one twentieth of the average rectified DC output.

I claim:

1. A transformer for switched mode power supplies and similar applications with very low end for end interwinding capacitance, and very high end for end dielectric isolation, having an electrical input for receiving electrical power from a source of electrical power and having at least a first electrical output for delivering electrical power to an external load, comprising an input transformer stage characterized for very low input leakage inductance and good coupling without regard for interwinding capacitance and dielectric isolation, and at least a first output transformer stage characterized for very low interwinding capacitance and high dielectric isolation, the input transformer stage comprising an input transformer stage primary winding and an input transformer stage secondary winding wound on an input transformer stage magnetic core, the at least a first output transformer stage comprising an output transformer stage primary winding and an output transformer stage secondary winding wound on an output transformer stage magnetic core, the input transformer stage primary winding comprising at least one of a single winding, a center-tapped winding and a split winding and further comprising at least first and second input transformer stage primary winding terminations which are the electrical input for the transformer, the output transformer stage secondary winding comprising at least one of a single winding, a center-tapped winding and a split winding and further comprising at least first and second output transformer stage secondary winding terminations which are the at least a first electrical output for the transformer, the input transformer stage secondary winding comprising a single winding having first and second input transformer stage secondary winding terminations, the output transformer stage primary winding comprising a single winding having first and second output transformer stage primary winding terminations, the first input transformer stage secondary winding termination being connected to the first output transformer stage primary winding termination, the second input transformer stage secondary winding termination being connected to the second output transformer stage primary winding termination, in the input transformer stage, the input transformer stage secondary winding is very closely wound with the input transformer stage primary winding with minimal insulation and space between them for good coupling and low leakage inductance, and in the at least a first output transformer stage, the output transformer stage primary winding has a minimal surface area and a large spacing to the output transformer stage secondary winding for very low interwinding capacitance and high dielectric isolation, whereby the transformer as a whole will have very low end to end interwinding capacitance and very high end to end dielectric isolation.

2. The transformer of claim 1 having a plurality of output transformer stages so as to have a plurality of electrical outputs.

3. The transformer of claim 1 wherein the input transformer stage secondary winding is connected to a safety ground.

4. The transformer of claim 1 wherein the large spacing to the output transformer stage secondary winding is mostly empty space.

5. The transformer of claim 1 wherein at least one of the input transformer stage primary winding, the input transformer stage secondary winding, the output stage primary winding and the output stage secondary winding has a heatsinking means for conducting excess heat out of the transformer.

6. The transformer of claim 5 wherein the heatsinking means is electrically insulating.

7. A transformer for switched mode power supplies and similar applications with very low end for end interwinding capacitance, and very high end for end dielectric isolation, having an electrical input for receiving electrical power from a source of electrical power and having at least a first electrical output for delivering electrical power to an external load, comprising an input transformer stage characterized for very low input leakage inductance and good coupling without regard for interwinding capacitance and dielectric isolation, an intermediate transformer stage characterized for very low interwinding capacitance and very high dielectric isolation, and at least a first output transformer stage, the input transformer stage comprising an input transformer stage primary winding and an input transformer stage secondary winding wound on an input transformer stage magnetic core, the intermediate transformer stage comprising an intermediate stage primary winding and an intermediate transformer stage secondary winding wound on an intermediate transformer stage magnetic core, the at least a first output transformer stage comprising an output transformer stage primary winding and an output transformer stage secondary winding wound on an output transformer stage magnetic core, the input transformer stage primary winding comprising at least one of a single winding, a center-tapped winding and a split winding and further comprising at least first and second input transformer stage primary winding terminations which are the electrical input for the transformer, the output transformer stage secondary winding comprising at least one of a single winding, a center-tapped winding and a split winding and further comprising at least first and second output transformer stage secondary winding terminations which are the at least a first electrical output for the transformer, the input transformer stage secondary winding comprising a single winding having first and second input transformer stage secondary winding terminations, the output transformer stage primary winding comprising a single winding having first and second output transformer stage primary winding terminations, the intermediate transformer stage primary winding comprising a single winding having first and second intermediate stage primary winding terminations, the intermediate transformer stage secondary winding comprising a single winding having first and second intermediate stage secondary winding terminations, the first input transformer stage secondary winding termination being connected to the first intermediate transformer stage primary winding termination, the second input transformer stage secondary winding termination being connected to the second intermediate transformer stage primary winding termination, the first intermediate transformer stage secondary winding termination being connected to the first output transformer stage primary winding termination, the second intermediate transformer stage secondary winding termination being connected to the second output transformer stage primary winding termination, in the input transformer stage, the input transformer stage secondary winding is very closely wound with the input transformer stage primary winding with minimal insulation and space between them for good coupling and low leakage inductance, and in the intermediate transformer stage, the intermediate transformer stage primary winding has a minimal surface area and a large spacing to the intermediate transformer stage secondary winding for very low interwinding capacitance and high dielectric isolation, whereby the transformer as a whole will have very low end to end interwinding capacitance and very high end to end dielectric isolation.

8. The transformer of claim 7 having a plurality of output transformer stages so as to have a plurality of electrical outputs.

9. The transformer of claim 7 where in the at least a first output transformer stage, the output transformer stage primary winding has a minimal surface area and a large spacing to the output transformer stage secondary winding for very low interwinding capacitance and high dielectric isolation.

10. The transformer of claim 7 wherein the input transformer stage secondary winding is connected to a source environment safety ground.

11. The transformer of claim 7 wherein the intermediate stage secondary winding is connected to an output environment safety ground.

12. The transformer of claim 7 wherein the large spacing to the intermediate transformer secondary winding is mostly empty space.

13. The transformer of claim 7 wherein at least one of the input transformer stage primary winding, the input transformer stage secondary winding, the intermediate transformer stage primary winding, the intermediate transformer stage secondary winding, the output stage primary winding and the output stage secondary winding has a heatsinking means for conducting excess heat out of the transformer.

14. The transformer of claim 13 wherein the heatsinking means is electrically insulating.

* * * * *